Patented Oct. 23, 1928.

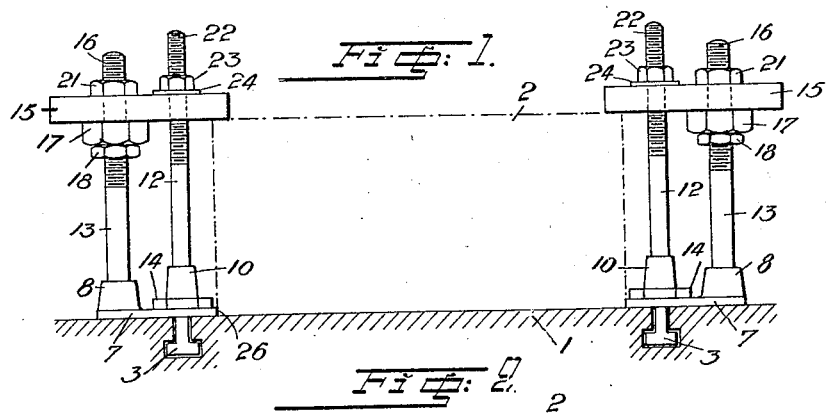
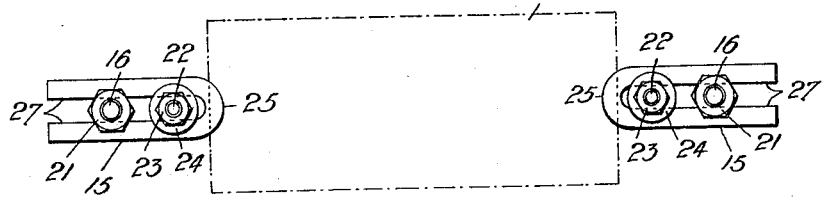
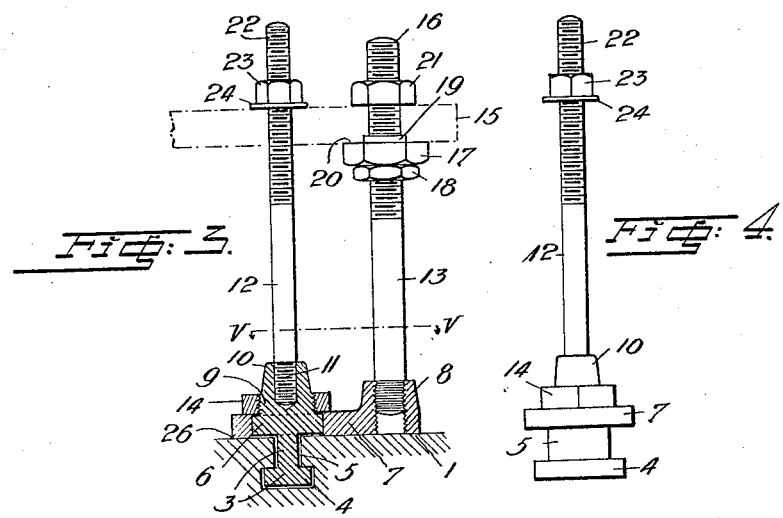
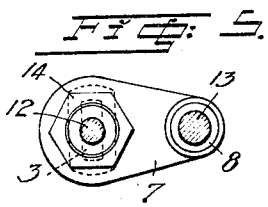

1,689,022

UNITED STATES PATENT OFFICE.

HENRY GRAHAM, OF ULRIKSDAL, SWEDEN.

COMBINED CLAMPING AND SUPPORTING DEVICE.

Application filed March 25, 1927, Serial No. 178,472, and in Germany January 2, 1926.

The present invention has for its object a combined clamping and supporting device for clamping working pieces to the benches or such like of working machines.

Hitherto no such suitable clamping device for clamping the working piece to the benches of working machines has been available, which has been suitable for use with working pieces with different forms and sizes, and for clamping the same in various positions on the bench of the working machines, and for similar purposes. The present invention has for its object a clamping device which can be used for working pieces of different forms and sizes, and which in a simple and convenient manner enables the working piece to be clamped fast in different positions on the bench.

For illustrating the invention there is shown on the attached drawing by way of example one form of construction of the same.

Fig. 1 shows in lateral view two clamping devices constructed according to the present invention, attached to a bench, which is shown in section with a working piece clamped fast by means of the same, shown in lines with dots and dashes.

Fig. 2 shows the same seen from above.

Fig. 3 shows the clamping device in lateral view, partly in vertical section.

Fig. 4 shows in elevation, a bolt, seen in Fig. 3, belonging to the device.

Fig. 5 shows a detail seen from above, with certain portions cut away along the line V—V in Fig. 3.

1 designates the bench. 2 designates the working piece which is to be clamped in the desired position in the same. The clamping device, of which two co-operating with each other—but otherwise similar as to their construction—is shown to the left and right respectively in Figures 1 and 2, is composed of the following parts: 3 is a bolt formed with a head 4 and a neck 5, which can be inserted into corresponding grooves or recesses in the bench 1. Above the neck 5 the bolt 3 is formed with a circular part 6, suitably formed into a head which rests against the upper surface of the bench when the bolt is inserted in the groove on the bench intended for the same. On the said head 6 there is rotatably arranged a plate or arm 7, which at its one end is provided with holes corresponding to the shape of the head, so that the plate 7 can be turned round the said head 6 as a pivot according to the size. The plate 7 is at its other end formed with an inwardly threaded part 8, adapted to receive a bolt 13 threaded in a corresponding manner. The bolt 3 is, above the head 6, formed with an outwardly threaded, bolt-like portion 9, which is provided with an upward projecting part 10 this being provided with a central, inwardly threaded hole or cavity 11, adapted to receive a bolt 12 threaded in a corresponding manner. 14 designates a lock-nut, intended for locking the supporting plate or arm 7, which through the tightening of the said nut can be clamped in the desired adjusted position against the bench 1. The bolt 13, which serves for supporting the clamping member 15, which may have any shape whatsoever suitable for the purpose, is selected in every particular case with regard to its length in relation to the size or height of the working piece that is to be clamped fast. This bolt is upwardly provided with a threaded portion 16, and on this portion there is screwed a lockable support-nut 17, which is suitably locked with a downward motion by means of the lock-nut 18. The nut 17 is on its upper side formed with an upright portion or neck 19, which serves as support for the clamping member 15 which from below is supported by the upper supporting surface 20 of the nut 17 that is formed round about the said neck. By means of the nut 21, which is screwed upon the bolt 13 supporting the clamping member 15, this member 15 is clamped against the upper surface of the support-nut 17 when changing the working piece for retaining the clamping member. The bolt 12, which with its lower part is screwed into the prolongation 10 of the bolt 3, is on its upper part 22 threaded, and on this part there is arranged a nut 23 with washer 24, which nut or washer, as the case may be, on being tightened rests against the upper side of the clamping member 15 and presses this member downward, so that its portion 25 resting against the working piece 2 is made to press against the working piece, which by this means is clamped fast to the bench.

The plate 7 is suitably formed in such a manner that one part 26 of the same can form a supporting point or surface for the working piece in the manner illustrated in Fig. 1, by which means the same is more securely retained in a fixed position.

The clamping member 15 itself can, as stated above, be of any suitable form whatsoever, adapted to the working piece which is to be clamped fast. According to the form of construction illustrated here by way of example this member has a U-shape and grips with its two shanks 27 round the two bolts 12, 13.

The clamping device is used by way of example in the following manner:

The bolt 3 is inserted in the groove on the bench intended for it, which bench may be horizontal, vertical, or oblique. Thereafter the plate 7 is attached to the flange-like portion 6 on the bolt 3 and the lock-nut 14 is applied to the threaded portion 9 and tightened, after the plate has been adjusted in a desired position for the purpose. By tightening the nut 14 both the bolt 3 and the plate 7 are simultaneously locked to the bench, by which means a fixed entity, rigidly united with the bench, is obtained for supporting the remaining parts belonging to the clamping device.

After this the supporting bolt 13 (of which several lengths are kept in stock, so that in every particular case a suitable length can be selected) is screwed on. The bolt 13 is screwed into part 8 of the plate 7, and the bolt 12 is screwed in a similar manner into the part 10 on the bolt 3. The clamping member 15 is applied in the manner described above.

The washer 24 and the nut 23 are applied to the bolt 12 and the nut 17, adjusted and locked by means of the nut 18 at a suitable height so that the fastening member, when resting against the working piece with its one end, is made to assume a position suitable for the purpose, e. g. in such a manner that it is parallel to the bench 1, whereupon the nut 23 on the bolt 12 is tightened.

The nut 21 on the bolt 13 serves, as mentioned above, for retaining the clamping member 15. According to circumstances one can use one, two or more such clamping devices as described above for clamping the working piece fast to the bench. On the drawing there have by way of example in Figures 1 and 2 been shown two such devices co-operating with each other.

The present invention entails inter alia the following advantages, which may be specially pointed out:

(1) By locking the bolt 3 in the bench a steady rigid entity is obtained for supporting and adjusting the clamping device.

(2) By locking the said bolt 3 the plate 7 is simultaneously locked in the desired position by which means the fixed position of the bolt 13 in vertical level is obtained.

(3) By locking the support-nut 17 at different heights a variable height position is obtained for the clamping member 15.

(4) By uniting the bolt 3 and the plate 7 a firm base is obtained for the working piece.

(5) By the bolts 12 and 13 being releasably fixed, bolts of lengths suitable for the purpose of supporting the clamping device can be selected in every particular case.

(6) After the first adjustment of the clamping device has been made, the bolts 12 and 13 which serve as a vise or support, as the case may be, for the clamping devices, retain the same position for succeeding operations of clamping fast the working piece.

(7) The support-bolt 13 can by turning the plate 7 be adjusted in various positions suitable for the purpose.

Having thus described my invention I declare that what I claim is:—

1. A combined clamping and supporting device for clamping work pieces to benches on working machines and for similar purposes, comprising a pivot member adapted to be locked to the bench in adjustable positions, and an armlike member pivotally fastened to said pivot member, means for locking the pivot member in adjusted positions on the bench and for locking the armlike member in adjusted positions in relation to the pivot member, a screw-threaded member extending from the pivot member, and another screw threaded member fastened to the armlike member, said screw threaded members carrying a clamping member and being provided with nuts for holding the clamping member in any desired position and thereby pressing said clamping member against the work piece.

2. A combined clamping and supporting device for clamping work pieces to benches on working machines and for similar purposes, comprising a pivot member adapted to be locked to the bench in adjustable positions, and an armlike member pivotally fastened to said pivot member, means for locking the pivot member in adjusted positions on the bench and for locking the armlike member in adjusted positions in relation to the pivot member, a screw threaded member extending from the pivot member, and another screw-threaded member fastened to the armlike member, said screw-threaded members carrying a clamping member and being provided with nuts for holding said clamping member in any desired position and pressing said member against the work-piece, said pivot member consisting of a boltlike portion formed with a head and a neck adapted to be inserted in a corresponding groove on the bench, and above said neck, a flangelike extension adapted to serve as a pivot for the plate supporting the second said screw threaded member, said pivot member being provided with a threaded portion, and upon said portion, a nut for locking said pivot member and said plate in the desired position on the bench.

3. A combined clamping and supporting device for clamping work pieces to benches on working machines and for similar purposes, comprising a pivot member adapted to be locked to the bench in adjustable positions and an armlike member pivotally fastened to said pivot member, means for locking the pivot member in adjustable positions in the bench and for locking the armlike members in adjusted positions in relation to the pivot member, a screw threaded boltlike member extending from the pivot member, and another boltlike member fastened to the armlike member, said bolt members carrying a clamping member at their upper ends, and being provided with means for holding the clamping member in any desired position and for pressing the clamping member against the work piece, said pivot member consisting of a boltlike portion formed with a head and a neck adapted to be inserted in a corresponding groove on the bench, and above said neck, a flange-like extension adapted to serve as a pivot for the plate supporting the bolt, said pivot member being provided with a threaded portion upon which a nut is located for locking the said part and the plate in the desired position on the bench, said part being further formed with a threaded portion for releasable attachment of a bolt, said bolt being provided at its other end with a threaded portion, said portion carrying a nut to be screwed down to clamp the clamping member to the work-piece.

4. A combined clamping and supporting device for clamping work-pieces to benches on working machines and for similar purposes, comprising a pivot member adapted to be locked to the bench in adjustable positions, and an armlike member pivotally fastened to said pivot member, means for locking the pivot member in adjusted positions in the bench and for locking the armlike member in adjusted positions in relation to the pivot member, a screw threaded boltlike member extending from the pivot member, and another boltlike member fastened to the armlike member, said bolts carrying a clamping member and being provided with nuts for holding the clamping member against the work-piece, the armlike member having an inside-threaded boss thereon, and engaged in said boss, a correspondingly threaded bolt for supporting a clamping device.

5. A combined clamping and supporting device for clamping work-pieces to benches on working machines and for similar purposes, comprising a pivot member adapted to be locked to the bench in adjustable positions and an armlike member pivotally fastened to said pivot member, means for locking the pivot member in adjusted positions in the bench and for locking the armlike member in adjusted positions in relation to the pivot member, a screw threaded boltlike member extending from the pivot member, and another boltlike member fastened to the armlike member, said bolts carrying a clamping member and being provided with nuts for holding the clamping member in any desired position and for pressing the clamping member against the working piece, the armlike member having thereon an inside-threaded boss, said boss carrying a correspondingly threaded bolt, said bolt supporting a clamping device, said bolt being provided with a threaded portion, said portion bearing an adjustable locking nut and serving as a support for the clamping member, and carrying a nut for clamping the clamp against the support-nut, said support nut having a neck-like portion serving as a protection for the threads and as a support for the clamping device in a lateral direction.

In testimony whereof I affix my signature.

HENRY GRAHAM.